United States Patent [19]

Sansone

[11] Patent Number: 4,859,038

[45] Date of Patent: Aug. 22, 1989

[54] NON-VOLATILE MEMORY DISPLAY CELL

[75] Inventor: Ronald P. Sansone, Weston, Conn.

[73] Assignee: Pitney Bowes Inc., Stamford, Conn.

[21] Appl. No.: 685,812

[22] Filed: Dec. 24, 1984

[51] Int. Cl.[4] .............................................. G02F 1/17
[52] U.S. Cl. ................................... 350/357; 340/763;
350/363
[58] Field of Search ................ 350/357, 363; 340/763,
340/715; 204/407; 315/129

[56] References Cited

U.S. PATENT DOCUMENTS

| | | | |
|---|---|---|---|
| 3,153,113 | 10/1964 | Flanagan et al. | 350/363 |
| 3,896,452 | 7/1975 | Brown | 346/74 P |
| 4,001,809 | 1/1977 | Fukui et al. | 340/336 |
| 4,041,481 | 8/1977 | Sato | 340/324 M |
| 4,096,412 | 6/1978 | Sekiya et al. | 340/763 |
| 4,153,345 | 5/1979 | Duchene | 350/363 |
| 4,156,559 | 5/1979 | Duchene | 350/363 |
| 4,203,106 | 5/1980 | Dalisa et al. | 340/787 |
| 4,218,302 | 8/1980 | Dalisa et al. | 204/299 R |
| 4,242,677 | 12/1980 | Jonath | 340/715 |
| 4,247,852 | 1/1981 | Utzinger | 315/129 |
| 4,283,121 | 8/1981 | Meyer | 350/363 |
| 4,306,755 | 12/1981 | Delapierre et al. | 350/363 |
| 4,307,392 | 12/1981 | Loshbough et al. | 340/715 |
| 4,309,083 | 1/1982 | Duchene et al. | 350/357 |
| 4,342,628 | 8/1982 | Buchholz | 204/407 |
| 4,345,820 | 8/1982 | Chabrolle | 350/362 |
| 4,368,952 | 1/1983 | Murata et al. | 350/362 |
| 4,420,748 | 12/1983 | Jürgen | 340/715 |

OTHER PUBLICATIONS

Duchene et al. "Electrolytic Display", IEEE Trans. on Electron Devices, 8-1979, pp. 1243–1245.

Primary Examiner—Bruce Y. Arnold
Assistant Examiner—Martin Lerner
Attorney, Agent, or Firm—Peter Vrahotes; Melvin J. Scolnick; David E. Pitchenik

[57] ABSTRACT

An electrolytic display cell includes two plates, one of which is covered by a semi-transparent electrode. The display is obtained by connecting the electrode to a source of potential of a first polarity and the erasing by connecting the electrode to a source of potential of a second polarity. The electrode has a first terminal and a second terminal. The first and the second terminal are adapted to be connected to apparatus for detecting whether the electrode has been made visible.

8 Claims, 3 Drawing Sheets

NON-VOLATILE MEMORY DISPLAY CELL

CROSS REFERENCES TO RELATED APPLICATIONS

Reference is made to concurrently filed U.S. Patent Application of Ronald Sansone for ELECTRONIC POSTAGE METER NON-VOLATILE MEMORY SYSTEMS HAVING BOTH HUMAN VISUALLY READABLE AND MACHINE READABLE STORED DATA, Ser. No. 685,681.

FIELD OF THE INVENTION

The present invention relates to non-volatile memory cell, and more particularly, to a non-volatile memory cell which is adapted to be human visually readable and machine readable.

BACKGROUND OF THE INVENTION

Non-volatile display cells have been developed. One such non-volatile display cell is shown in U.S. Pat. No. 4,309,083 for ELECTRODE FOR ELECTROLYTIC CELL PARTICULARLY FOR ELECTROLYTIC DISPLAY CELLS AND PROCESS OF MANUFACTURE and in U.S. Pat. No. 4,306,755 for ELECTROLYTIC DISPLAY CELL AND CONTROL THEREOF. These non-volatile display cells are of the plating variety and have been suggested as being useful in seven segment displays as for example for watches and clocks.

In display cells of the above type, an electrolytic solution such as a metal salt in aqueous solution is disposed between an electrode or segment and the ground plane. Leads are connected to the ground plane and electrode and are brought out to a connector. The display electrode or segment may be a tin oxide coating, such as a nesa coating, deposited on a glass support substrate. In a like manner, the ground plane may also be a tin oxide coating, such as a nesa coating, deposited on a glass substrate. The various leads may be fabricated from tin oxide or other suitable material and encapsulated in an insulating material such as silicone dioxide to prevent interaction with the electrolytic solution. The structure and operation of the display as associated with the write and erase operation only is disclosed in the above noted U.S. Patents, namely U.S. Pat. No. 4,309,083 for ELECTRODE FOR ELECTROLYTIC CELL PARTICULARLY FOR ELECTROLYTIC DISPLAY CELLS AND PROCESS OF MANUFACTURE and in U.S. Pat. No. 4,306,775 for ELECTROLYTIC DISPLAY CELL AND CONTROL THEREFORE. The disclosures of these two patents are hereby incorporated by reference into the disclosure of this application. It should be noted that the system disclosed in U.S. Pat. No. 4,306,775 employs an additional electrode for controlling the writing and erase current associated with plating and deplating the display segment.

U.S. Pat. No. 4,345,820 for VISUAL DISPLAY APPARATUS FOR ELECTRICAL SIGNALS RECORDED ON A MAGNETIC MEDIUM discloses an apparatus for the visual display of electrical signals recorded on a magnetic medium or support in the form of a magnifying glass which is a plate or sheet of transparent material in which there is a dimple closed by a membrane. The volume of a dimple containing a developing film sensitive to the magnetic field of a recording medium dispersion in a liquid. Under action of a magnetic field, the ferrite particles are displaced and give an image of the magnetic state of the medium.

SUMMARY OF THE INVENTION

The present invention provides a display cell with non-volatile characteristics. The display cell structure provides the ability to determine by machine whether a display has been obtained to thereby render a portion of the cell visible to the human eye.

It has also been discovered that a non-volatile display cell can be provided which provides both human visually readable and machine readable storage of data. A non-volatile memory display cell of the present invention is adapted to be connected in a system, without the need for battery backup, such that data can be stored during periods of power interruption which can be human visually readable and which same data further upon the restoration of power and during periods of normal operation, can be machine readable.

An electrolytic display cell embodying the present invention includes two plates whereof one is covered by a semitransparent electrode. An electrolyte solution containing platable marking particles is disposed between the plates. The display is obtained by connecting the electrode to a source of potential of a first polarity and the erasing by connecting the electrode to a source of potential of a second polarity. The electrode has a first terminal and a second terminal. The first and the second terminals are adapted to be connected to apparatus for detecting whether a display has been obtained on the electrode.

BRIEF DESCRIPTION OF THE DRAWINGS

Reference is now made to the drawings wherein like reference numerals designate similar elements in the various figures, and in which.

DETAILED DESCRIPTION

Figure 1:
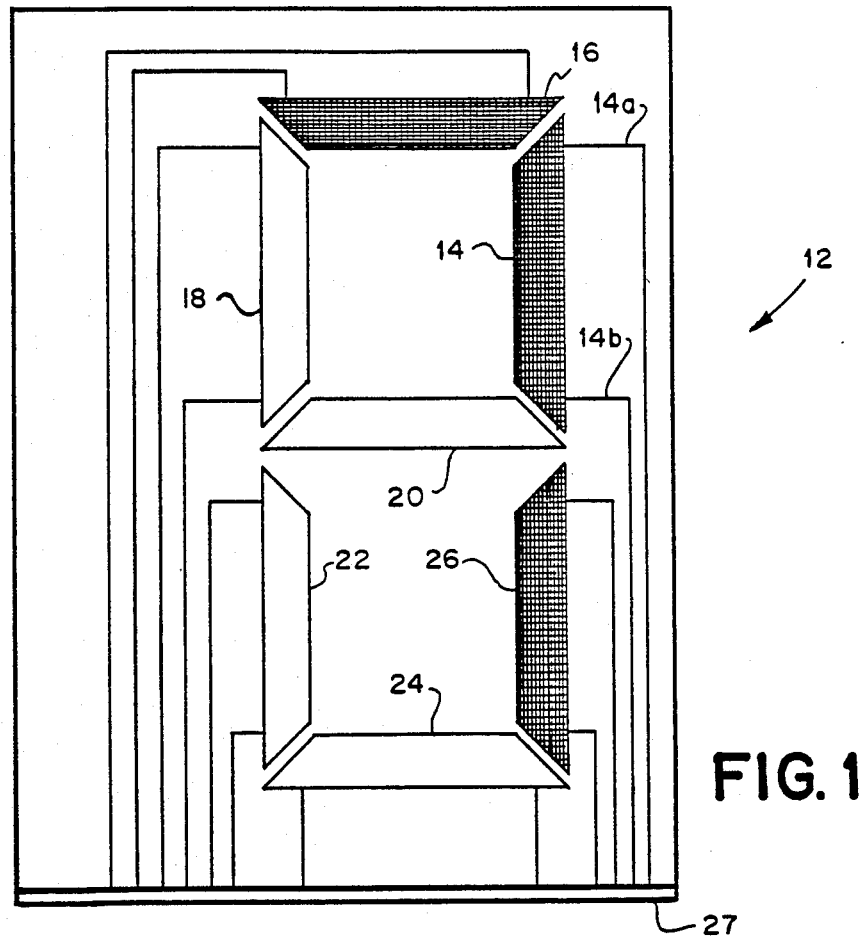
FIG. 1 is a diagrammatic view of a seven segment non-volatile memory and display cell embodying the present invention.

Reference is now made to FIG. 1. A memory display 12 includes seven segments 14, 16, 18, 20, 22, 24, and 26. The segments each include two leads connected at either end of the segment. Referencing segment 14, a first lead 14a is connected to the top end of the segment and a second lead 14b is connected to the bottom end of the segment. Each of the remaining segments have similar leads connected thereto. The leads for each segment are brought to an edge connector 27 for further connection to other circuitry, as for example as is shown in FIGS. 4-7. As will be explained in greater detail hereinafter, one of the leads for each segment is employed in connection with writing and erasing the display segment while the other lead, in conjunction with the first lead, is used in reading by mechanical means, such as a computer, to determine whether or not the segment has been made visible.

Figure 2:
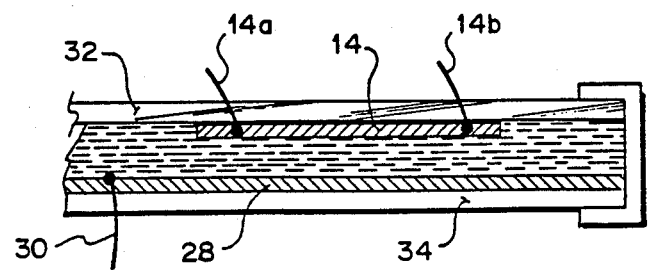
FIG. 2 is a side view of the seven segment non-volatile memory and display shown in FIG. 1.

Reference is now made to FIG. 2 which shows additional structure of the display. A ground plane 28 is spaced apart from the display segment 14, as well as the other display segments 16, 18, 20, 22, 24, and 26. An electrolytic solution such as a metal salt in aqueous or non-aqueous solution is disposed between the segment 14 and the ground plane 28. End caps, only one of which is shown, are provided to retain the solution or paste in the proper position between the segment 14 and ground plane 28. A lead 30 is connected to the ground plane 28 and is brought out to the connector 27, shown in FIGS. 3-5. The display segment 14 may be a tin oxide coating, such as a "nesa" coating, deposited on a glass support substrate 32. In a like manner, the ground plane 28 may be a silver coating, deposited on a glass substrate 34. The various leads may also be fabricated from tin oxide or other suitable material and encapsulated in an insulating material such as silicon dioxide to prevent interaction with the electrolytic solution. The structure and operation of the display as associated with the write and erase operation only is disclosed for example in U.S. Pat. No. 4,309,083 for ELECTRODE FOR ELECTROLYTIC CELL PARTICULARLY FOR ELECTROLYTIC DISPLAY CELLS AND PROCESS OF MANUFACTURE and in U.S. Pat. No. 4,306,775 for ELECTROLYTIC DISPLAY CELL AND CONTROL THEREFORE. The system disclosed in U.S. Pat. No. 4,306,775 employs an additional electrode for controlling the writing and erase current associated with plating and deplating the display segment.

Figure 3:
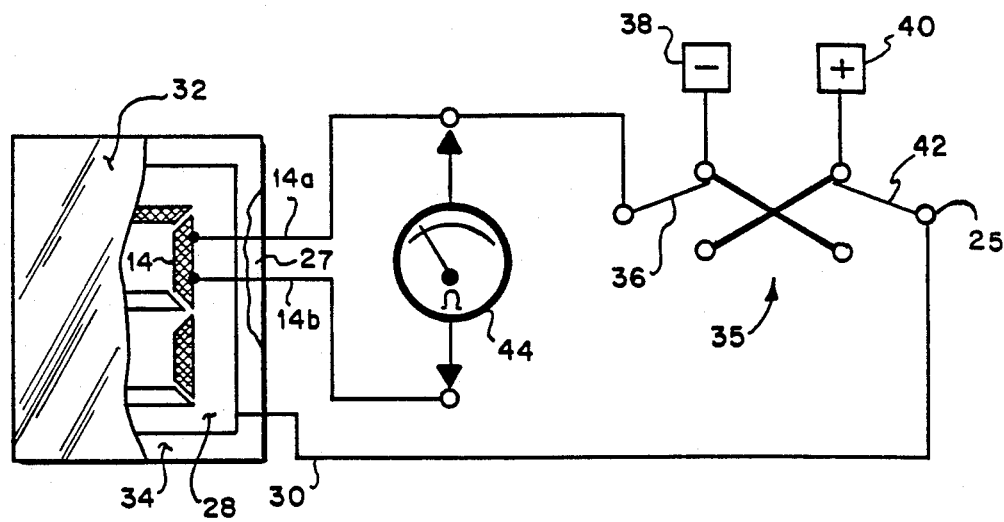
FIG. 3 is a diagramatic view of a single segment of the non-volatile memory and display embodying the present invention and shown in FIG. 1 connected to a system for detecting whether the display element has been made visible.

Reference is now made to FIG. 3 which shows a single display segment. Lead 14a is connected through connector 27 to a switch 35 which is adapted to be switched to connect leads 14a and 30 between a source of positive potential 40 and a source of negative potential 38. With the return lead 30 connected via switch 42 contact to the positive potential, and with switch 36 contact connected to the source of negative potential 38, the metal salt in the electrolytic solution will be plated onto the segment 14 making the segment visible to the naked eye. At the same time, by plating the electrode with highly conductive silver, the electrode is made significantly more conductive, thereby reducing its bulk impedance as measured by ohmmeter 44.

It will be appreciated that the actual change of conductivity is highly related to the area and thickness of the silver coating. The change will be in accordance with the formula set forth below.

In the formula for the resistance of a strip of Nesa (stannic oxide) coated with silver, L is the length of the segment, W is the width of the segment, $h_{Ag}$ is the thickness of height of the silver, and $h_{Nesa}$ is the thickness of height of the Nesa. The bulk resistivity of silver is $P_{Ag} = 1.6 \times 10^{-8} \Omega m$. The bulk resistivity of Nesa is about $P_{Nesa} \simeq 10^{-5} \Omega m$. The resistance of the silver is $$R_{Ag} = P_{Ag} \frac{L}{W h_{Ag}} .$$

The resistance of the Nesa is $$R_{Nesa} = P_{Nesa} \frac{L}{W h_{Nesa}} .$$

The parallel resistance is:

$$R = \frac{R_{Ag} R_{Nesa}}{R_{Ag} + R_{Nesa}} = R_{Ag} \left[ \frac{1}{1 + R_{Nesa}/R_{Ag}} \right] = $$

$$P_{Ag} \frac{L}{W h_{Ag}} \left[ \frac{1}{1 + \frac{P_{Ag}}{P_{Nesa}} \frac{h_{Nesa}}{h_{Ag}}} \right]$$

Figure 4:
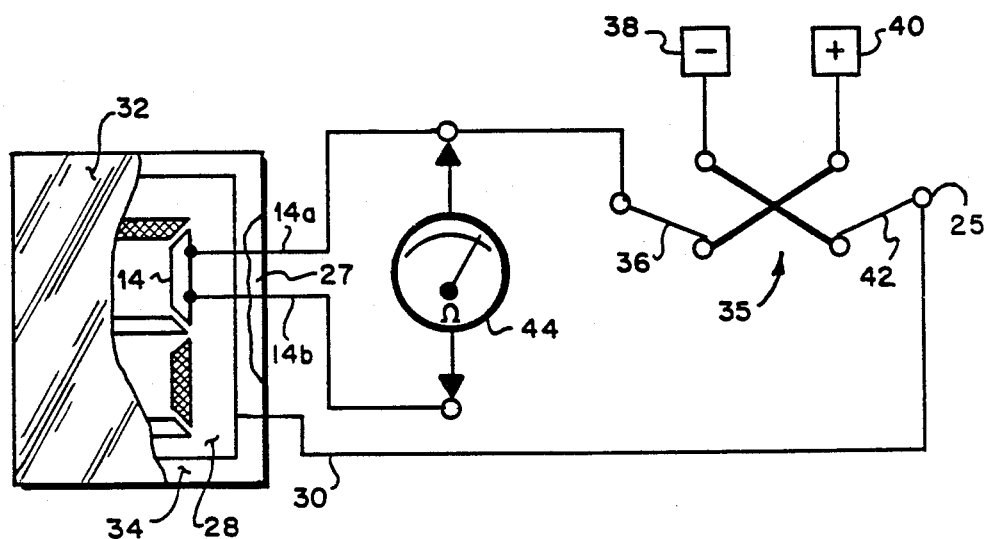
FIG. 4 is a diagramatic view of a single segment of the non-volatile memory display cell embodying the present invention and shown in FIG. 1 connected to a system for detecting whether the display element has been made visible with a ground return switch in its open condition to allow the impedance value of the display element to be determined.

With the return switch 42 connecting the plane lead 30 to negative potential 38 and the switch 36 connected to the source of positive potential 40, any plating on the segment 14 will be removed and returned to the electrolytic solution. This will cause the display segment to be substantially invisible to the naked human eye such as shown in FIG. 4. The cycle of plating and deplating can be repeated at a sufficiently high rate of speed to be used as both a display and a non-volatile memory.

Ohmmeter 44 is connected between the segment leads 14a and 14b to provide a device for detecting whether or not the display segment has been made visible to illuminate a particular data value or has been made substantially invisible to represent, in conjunction with other display segments, another human readable data value. In this manner, the display segments are both machine readable and human readable allowing the display non-volatile memory segments to provide the same data in both convenient human readable form and in machine readable form.

When the display segment impedance is measured by ohmmeter 44, should it be desired switches can be provided and opened to prevent additional plating or deplating of the display segment due to ohmmeter current. However, in the normal situation the current will be so small as to be inconsequential in this regard, especially as the ohmmeter is not connected by any lead to plane 28 and is only connected to the segment. Opening such a switch breaks the circuit path between the display segment and the plane 28 thereby avoiding further electrolytic action. The significant current flow is through the display segment 14 and the display segment leads 14a and 14b and not the electrolytic solution. The operation of any switch decoupling plane 28 from the source of positive and negative potential 40 and 38, respectively, can be an electronic switch, such as a transistor type switch, and can be ganged for synchronous operation with the operation of ohmmeter 44.

Figure 5:
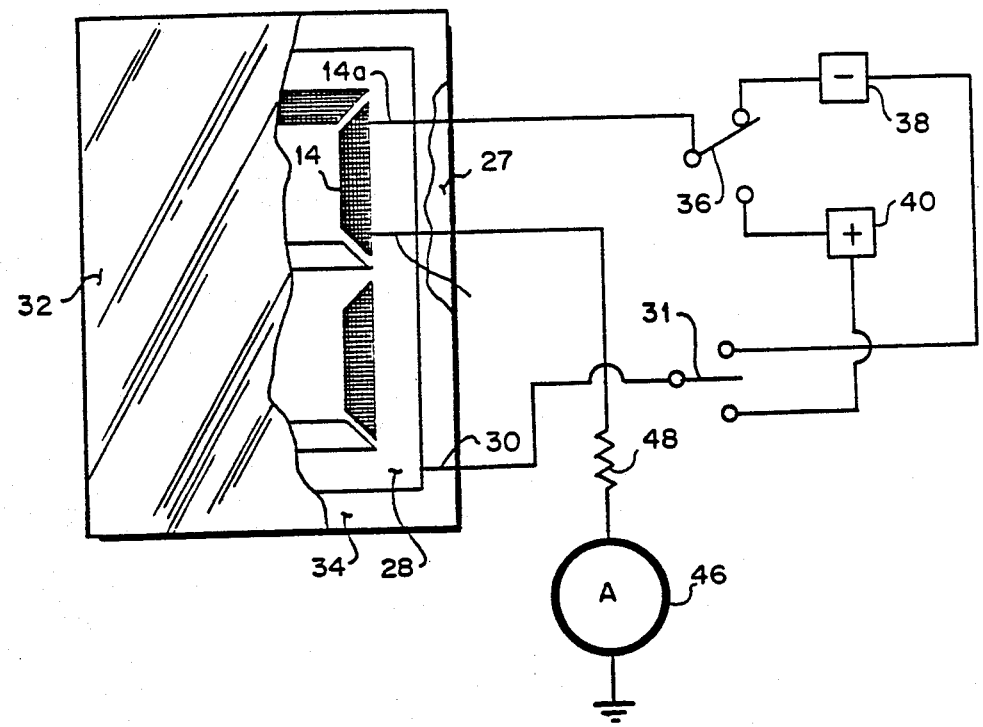
FIG. 5 is a diagramatic view of one element of the non-volatile display cell embodying the present invention and shown in FIG. 1 connected to an alternate system of detecting whether or not the segment is made visible.

An alternate method of detecting the visible condition of the display segments is shown in FIG. 5. The presence or absence of a plating on segment 14 is determined by ammeter 46 which is connected in series with current limiting resistor 48 between segment lead 14b and ground. With the switch 36 connected to either the negative source of potential 38 or the positive source of potential 40, a current is caused to flow through the segment and through the ammeter. This provides a machine readable indication of whether or not the display segment is in human visual readable form or is substantially invisible. In the embodiment, plane 28 is also selectively connected via lead 30 and switch 31 to the source of negative potential 38 and positive potential 40. The switches 36 and 31 are ganged for operation and operate in conjunction with operation of ammeter 46 to insure proper current flow during plating, deplating and ammeter operation. Moreover, the ammeter reading can be achieved in a pulse mode resulting in an extremely low current of short duration. Current limiting resistor 48 limits the current to a level which is insufficient to cause the segment to be further plated or to be deplated. It should be noted that switch 31 can be coupled to operate in conjunction with the reading of the condition of the segment 14 to further avoid any possible problem of plating or deplating.

It should be recognized that other segment machine readable techniques are suitable for use with the systems described above, as for example, by utilizing voltmeters.

It should be understood that implementation of other variations and modifications of the invention in its various aspects will be apparent to those skilled in the art, and that the invention is not limited by the specific embodiment described. Moreover, the electrolytic solution which may contain one of the group of silver, iodide, bromide and chloride and also containing an sale of one of the group of ammonium and halide for the displays disclosed in this application, may be composed of other suitable solutions allowing plating and deplating. It is therefore contemplated to cover by the present patent any and all modifications, variations or equivalents of the invention that fall within the true spirit and scope of the basic underlying principles disclosed and claimed herein.

What is claimed is:

1. An electrolytic display cell of the type comprising two plates whereof one is covered by a semitransparent electrode having a first terminal, an electrolyte solution containing platable marking particles disposed between said plates, the electrode being plated by connecting the first terminal of said electrode to a source of potential of a first polarity and the erasing by connecting said first terminal of the electrode to a source of potential of a second polarity, the improvement comprising: said electrode having a second terminal connected to a means for measuring an electrical characteristic whereby the presence of plating upon the electrode can be determined.

2. An electrolytic display cell as defined in claim 1 wherein said first and said second terminal are adapted to be connected to means for detecting whether a display has been obtained on said electrode.

3. An electrolytic display cell as defined in claim 1 wherein said electrode is a substantially linear shape electrode with end areas and said first and said second terminals are connected to said electrode adjacent opposite ends areas of said electrode.

4. An electrolytic display cell as defined in claim 1 wherein said solution comprises an electrolyte containing one of the group of silver, iodide, bromide and chloride, and also containing a salt of one of the group of ammonium and halide.

5. An electrolytic display cell of the type comprising a first plate and a second plurality of plates, each of said second plurality of plates covered by a semitransparent electrode having a first terminal, an electrolyte solution containing platable marking particles disposed between said first plate and said second plurality of plates, the display being obtained by connecting the first terminal of each of the plurality of electrodes to a source of potential of a first polarity and the erasing by connecting each of the first terminal of the plurality of electrodes to a source of potential of a second plurality, the improvement comprising: said plurality of plates being positioned to form alpha numeric characters when selected electrodes of said plurality of electrodes are plated by said platable marking particles and each of said plurality of electrodes having a second terminal connected to a means for measuring an electrical characteristic of the respective electrodes whereby the presence of plating upon the respective electrodes can be determined.

6. An electrolytic display cell as defined in claim 5 wherein said first and said second terminal of each of said plurality of electrodes are adapted to be connected to means for detecting whether a display has been obtained on said electrode.

7. An electrolytic display cell as defined in claim 5 wherein each of said plurality of electrodes is a substantially linear shape electrode with end areas and said first and said second terminals are connected to said electrode adjacent opposite ends areas of said electrode.

8. An electrolytic display cell as defined in claim 5 wherein said solution comprises an electrolyte containing one of the group of silver, iodine, bromide and chloride, and also containing a salt of one of the group of ammonium and halide.

* * * * *